(12) United States Patent
Kneuper et al.

(10) Patent No.: US 9,428,056 B2
(45) Date of Patent: Aug. 30, 2016

(54) ADJUSTABLE SYNTHETIC VISION

(71) Applicant: Cessna Aircraft Company, Wichita, KS (US)

(72) Inventors: Jeremy Joseph Kneuper, Hesston, KS (US); Jason Michael Decker, Wichita, KS (US); Isaac Wayne Stanfield, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 0 days.

(21) Appl. No.: 14/643,510

(22) Filed: Mar. 10, 2015

(65) Prior Publication Data

US 2015/0352952 A1 Dec. 10, 2015

Related U.S. Application Data

(63) Continuation-in-part of application No. 14/642,256, filed on Mar. 9, 2015.

(60) Provisional application No. 61/951,189, filed on Mar. 11, 2014, provisional application No. 61/951,260, (Continued)

(51) Int. Cl.
*B60K 35/00* (2006.01)
*G06F 3/041* (2006.01)
*B64D 43/00* (2006.01)
(Continued)

(52) U.S. Cl.
CPC ............ *B60K 35/00* (2013.01); *B64D 43/00* (2013.01); *B64D 47/08* (2013.01); *G01C 23/00* (2013.01); *G06F 3/0416* (2013.01); *G08G 5/0013* (2013.01); *G08G 5/0021* (2013.01);
(Continued)

(58) Field of Classification Search
USPC .............................. 701/36; 345/173; 340/970
See application file for complete search history.

(56) References Cited

U.S. PATENT DOCUMENTS 5,272,652 A * 12/1993 Rosenshein .............. G09B 9/30
273/442
7,719,483 B2 5/2010 Feyereisen et al.
(Continued)

FOREIGN PATENT DOCUMENTS

EP 1775556 B1 5/2011

OTHER PUBLICATIONS

International Search Report and Written Opinion issued in PCT/US2015/019437, Jun. 18, 2015, 14 pages.

*Primary Examiner* — Thomas G Black
*Assistant Examiner* — Tyler Paige
(74) *Attorney, Agent, or Firm* — Erise IP, P.A.

(57) ABSTRACT

Systems, methods and computer-storage media are provided for displaying a real-time image in a cockpit of an aircraft. Use of a synthetic vision application is provided with a gradient-type feature such that a level of synthetic enhancements applied to an image may be adjusted to a synthetic vision application value that is less than 100 percent. The synthetic vision enhancement may be overlaid with the original image, according to the synthetic vision application value, to generate a modified image. Additional information may overlay the original image with the synthetic vision application such as a three-dimensional weather representation. The synthetic vision application may be used in conjunction with a high-definition camera to generate the original image. The modified image may be updated in real-time such that an updated view is continuously modified with an updated synthetic vision enhancement to provide accurate real-time views.

20 Claims, 9 Drawing Sheets

Related U.S. Application Data filed on Mar. 11, 2014, provisional application No. 61/951,231, filed on Mar. 11, 2014, provisional application No. 61/951,240, filed on Mar. 11, 2014, provisional application No. 61/951,243, filed on Mar. 11, 2014, provisional application No. 61/951,157, filed on Mar. 11, 2014, provisional application No. 61/951,168, filed on Mar. 11, 2014, provisional application No. 61/951,201, filed on Mar. 11, 2014, provisional application No. 61/951,152, filed on Mar. 11, 2014, provisional application No. 61/951,195, filed on Mar. 11, 2014, provisional application No. 61/951,208, filed on Mar. 11, 2014, provisional application No. 61/951,220, filed on Mar. 11, 2014, provisional application No. 61/951,234, filed on Mar. 11, 2014, provisional application No. 61/951,166, filed on Mar. 11, 2014, provisional application No. 61/951,215, filed on Mar. 11, 2014, provisional application No. 61/951,253, filed on Mar. 11, 2014, provisional application No. 61/951,216, filed on Mar. 11, 2014, provisional application No. 61/951,223, filed on Mar. 11, 2014, provisional application No. 61/951,145, filed on Mar. 11, 2014.

(51) Int. Cl.
*B64D 47/08* (2006.01)
*G01C 23/00* (2006.01)
*G08G 5/00* (2006.01)

(52) U.S. Cl.
CPC .......... *G08G5/0052* (2013.01); *G08G 5/0091* (2013.01); *B60K 2350/1056* (2013.01)

(56) References Cited

U.S. PATENT DOCUMENTS

| | | |
|---|---|---|
| 8,264,376 B1 | 9/2012 | McLoughlin et al. |
| 8,494,760 B2 | 7/2013 | Yoel et al. |
| 2001/0035832 A1* | 11/2001 | Block .................. G08G 5/0021 340/971 |
| 2003/0156046 A1* | 8/2003 | Dwyer .................. G01C 23/00 340/973 |
| 2004/0140959 A1 | 7/2004 | Matsumura et al. |
| 2004/0236481 A1 | 11/2004 | Saint-Aroman et al. |
| 2009/0015674 A1 | 1/2009 | Alley et al. |
| 2009/0112380 A1 | 4/2009 | Nutaro et al. |
| 2010/0141482 A1* | 6/2010 | Wyatt .................... G01C 23/00 340/975 |
| 2010/0194602 A1* | 8/2010 | Engels .................. G08G 5/045 340/979 |
| 2010/0211237 A1* | 8/2010 | Nichols .................. G01C 23/00 701/14 |
| 2010/0211358 A1 | 8/2010 | Kesler et al. |
| 2010/0231418 A1* | 9/2010 | Whitlow .................. G01C 23/00 340/945 |
| 2010/0250030 A1* | 9/2010 | Nichols ................ G01C 23/005 701/7 |
| 2011/0193694 A1 | 8/2011 | Bowden et al. |
| 2011/0216059 A1 | 9/2011 | Espiritu et al. |
| 2011/0241901 A1 | 10/2011 | Firra |
| 2012/0026190 A1* | 2/2012 | He .......... G01C 21/00 345/633 |
| 2012/0221305 A1 | 8/2012 | Srivastav et al. |
| 2013/0054319 A1 | 2/2013 | Woods et al. |
| 2013/0076540 A1 | 3/2013 | McLoughlin et al. |
| 2013/0151046 A1 | 6/2013 | Choi et al. |
| 2013/0162632 A1* | 6/2013 | Varga .................... G06T 19/006 345/419 |
| 2013/0245860 A1 | 9/2013 | Cooper |
| 2014/0018979 A1 | 1/2014 | Goossen et al. |
| 2014/0022380 A1 | 1/2014 | Nissen et al. |
| 2014/0028476 A1 | 1/2014 | Kolbe et al. |
| 2014/0032097 A1 | 1/2014 | Kolbe et al. |
| 2014/0032103 A1 | 1/2014 | Kolbe et al. |
| 2014/0032105 A1 | 1/2014 | Kolbe et al. |
| 2014/0285661 A1* | 9/2014 | Feyereisen .......... G08B 13/196 348/148 |
| 2015/0262545 A1* | 9/2015 | Kneuper ................ G09G 5/003 345/4 |
| 2015/0352952 A1* | 12/2015 | Kneuper ................ B60K 35/00 701/36 |
| 2016/0004374 A1* | 1/2016 | Kneuper ................ G06F 3/0416 345/173 |

* cited by examiner

ADJUSTABLE SYNTHETIC VISION

CROSS REFERENCE TO RELATED APPLICATIONS

This application is a continuation-in-part of U.S. patent application Ser. No. 14/642,256, entitled "Touch Screen Instrument Panel", filed Mar. 9, 2015, which claims the benefit of each of U.S. Provisional Application No. 61/951,145, entitled "3D Weather", U.S. Provisional Application No. 61/951,189, entitled "HD Camera", U.S. Provisional Application No. 61/951,260, entitled "Adjustable Synthetic Vision System", U.S. Provisional Application No. 61/951,231, entitled "Skytrak Navigational Aid", U.S. Provisional Application No. 61/951,240, entitled "Smart Airport Application", U.S. Provisional Application No. 61/951,243, entitled "Smart Traffic Application", U.S. Provisional Application No. 61/951,157, entitled "Chart Synoptic Window", U.S. Provisional Application No. 61/951,168 entitled "Flight Planning Synoptic Window", U.S. Provisional Application No. 61/951,201 entitled "Intelligent Radio Frequency Identifiers", U.S. Provisional Application No. 61/951,152, entitled "Crew Alerting System", U.S. Provisional Application No. 61/951,195 entitled "Historical Data Feature", U.S. Provisional Application No. 61/951,208 entitled "Maintenance Synoptic Window", U.S. Provisional Application No. 61/951,220 entitled "Master Warning/Master Caution", U.S. Provisional Application No. 61/951,234 entitled "Proximity Icon", U.S. Provisional Application No. 61/951,166 entitled "Flight Control Synoptic Window", U.S. Provisional Application No. 61/951,215 entitled "Mode Controller and Engine Indication Icon", U.S. Provisional Application No. 61/951,253 entitled "Synoptic Window Layout", U.S. Provisional Application No. 61/951,216 entitled "Moveable Synoptic Pages", U.S. Provisional Application No. 61/951,223 entitled "Pinnable Synoptic Pages", all filed Mar. 11, 2014. The entireties of each of the aforementioned applications are incorporated by reference herein.

BACKGROUND

Synthetic vision systems (SVS) have been utilized in aircraft since the late 1970's. Synthetic vision systems are intended to improve cockpit situational awareness. For example, situations having poor visibility (e.g., bad weather, fog, night conditions, etc.) may benefit from use of SVS. The SVS may work in conjunction with a camera, one or more databases stored on board an aircraft, one or more databases stored off the aircraft, global positioning systems (GPS), and the like.

In all cases, synthetic vision is currently either on or off. Put simply, this means that the flight crew sees either a digitally created "synthetic" view in the on state or a non-enhanced view in the off state. There is no gradient with which to adjust synthetic enhancements to real-time views. Additionally, there is no gradient with which to adjust synthetic enhancements to real-time views when shown in combination with additional data displays such as, for example, weather.

SUMMARY

This summary is provided to introduce a selection of concepts in a simplified form that are further described below in the Detailed Description. This summary is not intended to identify key factors or essential features of the claimed subject matter, nor is it intended to be used as an aid in determining the scope of the claimed subject matter.

In various embodiments, systems, methods, and computer-readable storage media are provided for displaying a real-time image in a cockpit of an aircraft. With the use of a camera, a real-time image may be displayed. In embodiments, the camera is a high-definition (HD) camera mounted to the exterior of the aircraft.

In an embodiment, a method for displaying a real-time view within an aircraft is provided. The method comprises receiving an indication of a synthetic vision application, wherein the indication enables the synthetic vision application for the real-time view; identifying a synthetic vision application value to apply to the real-time view; applying a synthetic vision enhancement to the real-time view according to the synthetic vision application value; and generating a modified real-time view where the modified real-time view is enhanced by synthetic vision as indicated by the synthetic vision application value.

In another embodiment, a system for displaying a real-time view within an aircraft is provided. The system comprises a processor; and a memory having embodied thereon instructions that, when executed by the processor, cause a computing device to perform a method for displaying the real-time view within the aircraft, the method comprising: receiving an indication of a synthetic vision application, wherein the indication enables the synthetic vision application for the real-time view; identifying a synthetic vision application value to apply to the real-time view; applying the synthetic vision application value to the real-time view; and generating a modified real-time view where the modified real-time view is the real-time view enhanced by synthetic vision as indicated by the synthetic vision application value.

In yet another embodiment, one or more computer-storage media having embodied thereon computer-usable instructions that, when executed, facilitate a method of displaying a real-time image within an aircraft is provided. The claim recites receiving an indication to enable synthetic vision; based on the indication to enable synthetic vision, generating a second image including a synthetic vision enhancement overlaying the real-time image; receiving an indication to include weather data in the second image; and generating a modified second image that includes each of the synthetic vision enhancement and the weather data overlaying the real-time image.

Further embodiments and aspects will become apparent by reference to the drawings and by study of the following detailed description.

BRIEF DESCRIPTION OF THE DRAWINGS

Illustrative embodiments of the present invention are described in detail below with reference to the attached figures, which are incorporated by reference herein and wherein.

DETAILED DESCRIPTION

Embodiments of the present invention provide displaying a real-time image in a cockpit of an aircraft.

Figure 1:
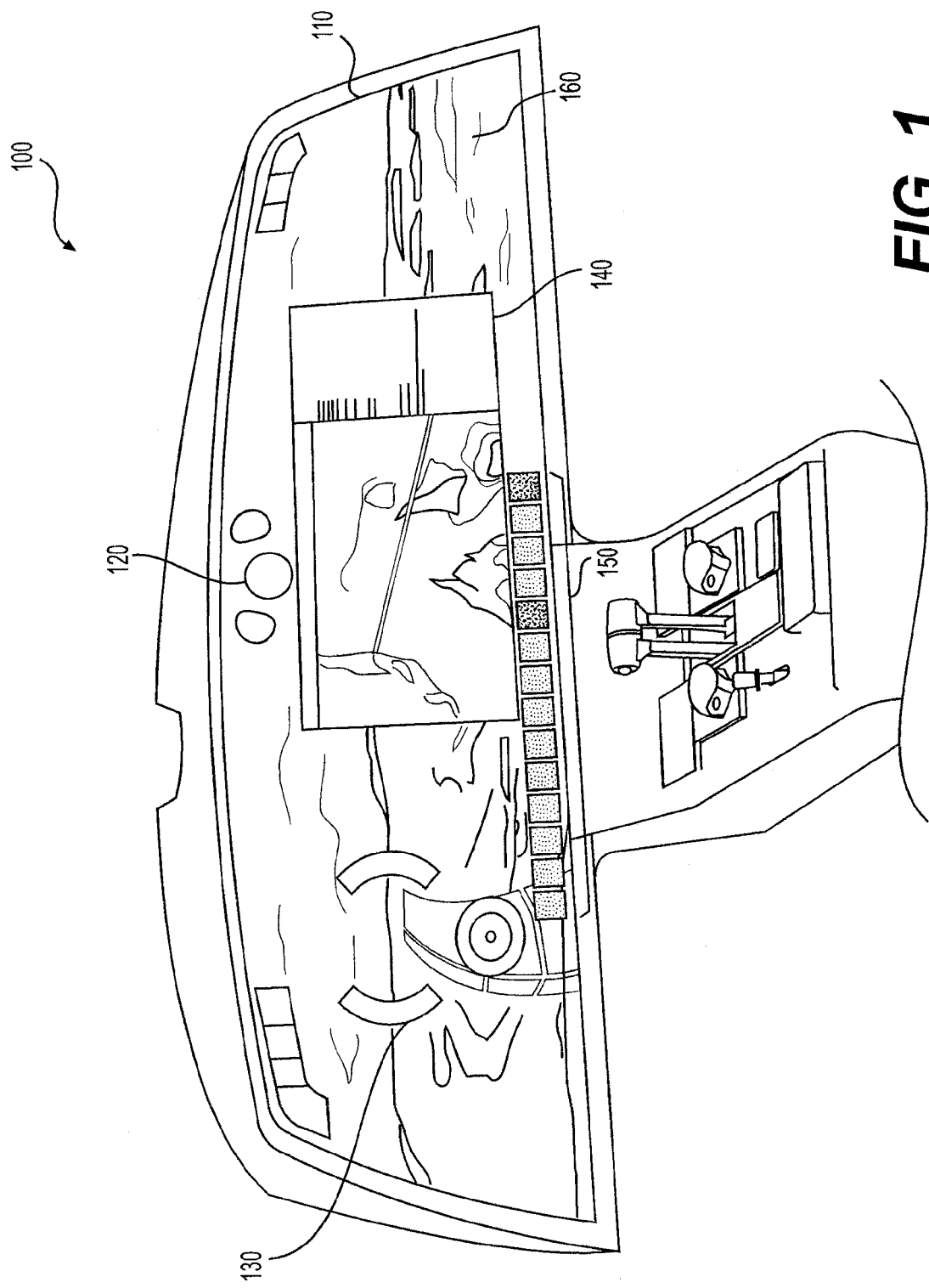
FIG. 1 depicts a perspective view of an embodiment of a touch-screen instrument panel system for an aircraft, in accordance with an embodiment of the present invention.

Referring to FIG. 1, a representation 100 of a touch-screen instrument panel (TSIP) is illustrated. The TSIP replaces the plurality of instruments, dials, gauges, and screens typically utilized on the console of an aircraft. The TSIP is configured for at least a touch screen implementation. In some embodiments, the TSIP may span the width of a cockpit of an aircraft. As illustrated in FIG. 1, the TSIP is the width of the cockpit and may be accessed by both a pilot, co-pilot, and the like.

The TSIP is a digital information panel and may include a plurality of digital layers. The digital layers may overlay one another to create multiple views. For instance, and as will be described in further detail below, one layer may be a real-time view while another layer may be a three-dimensional representation of, for example, weather while another layer may include flight instruments and may not be obstructed with any other layers or representations. A processor, similar to that onboard computer 201 of FIG. 2, for example, may stack the plurality of digital images to provide a complete real-time image including the real-time view and any other additional information stacked on top of it as deemed appropriate by the user. Additional information may include synthetic vision, three-dimensional weather, information regarding traffic or airports, etc. Furthermore, the TSIP may be configured such that, in the event of a failure or malfunction of the TSIP, each digital layer is cleared so that the flight instruments are accessible/viewable to users.

Turning back to FIG. 1, the representation 100 includes the TSIP 110, one or more flight instrument displays 120, one or more navigational displays 130, one or more user interface panels 140, a menu 150, and the real-time view 160. Initially, the real-time view displayed by the TSIP may be captured by a high-definition (HD) camera on the exterior of the aircraft. In an embodiment, the HD camera is mounted to the nose of the aircraft. The camera may be mounted in any appropriate position to capture a real-time view that gives a display of a view ahead of an aircraft. Additionally, as will be further discussed herein, the real-time view may be altered or enhanced by, for instance, synthetic vision enhancements.

The TSIP 110 further includes one or more flight instrument displays 120. The flight instrument display 120 may be configured to include any necessary information regarding the current configuration of the aircraft. Additionally, the flight instrument display 120 may be identically reproduced such that a plurality of users has easy access to the one or more flight instrument displays 120. By way of example, the flight instrument display 120 illustrated in FIG. 1 may be identically reproduced and positioned on the opposite side of the TSIP 110.

The TSIP 110 further includes one or more navigational displays 130. Similar to the one or more flight instrument displays 120, the one or more navigational displays 130 may be positioned anywhere within the TSIP 110. Additionally, the one or more navigational displays 130 may be reproduced for ease of access for multiple users. Given the size of the TSIP 110, the reproduction may be convenient when there is more than one user requiring access to the one or more navigational displays 130.

The TSIP 110 may include one or more user interface panels 140. The one or more user interface panels 140 may be displayed alone or in combination with other panels. The panels 140 display information and accept input from a user regarding various aircraft systems. Exemplary panels provide information regarding, but not limited to, anti-icing systems, environmental control systems, electrical systems, flight controls, hydraulic systems, cabin pressurization systems, interior and exterior lighting, propulsion systems, cabin window shades, weather maps, charts, maps, alerts, system information notifications, maintenance notifications, flight plans, traffic alerts, etc. Depending on the information displayed, user interface panels may be presented automatically (e.g., without user input) or upon receipt of a user input.

The TSIP 110 may further include a menu 150. The menu may include one or more selectors to aid a user in navigating the TSIP 110. For example, the menu 150 may include a weather indicator that provides a weather user interface panel. The menu 150 may also include a charts indicator to access various charts. Any feature that may be accessed via the TSIP may be represented in the menu 150. Various features will be described herein and in several of the applications related by subject matter, referenced above, and herein incorporated by reference in their entirety.

Additionally, the TSIP 110 may include a real-time view 160. The real-time view 160 may be an ahead-type view illustrating the view ahead of an aircraft. The real-time view 160 may be captured, as previously mentioned, by a camera mounted to the aircraft. The real-time view 160 may be a real-time panoramic view. Panoramic, as used herein, refers to a wide-angle view. In additional embodiments, infrared imaging may be used in the real-time view to aid in navigation at night, for instance.

Figure 2:
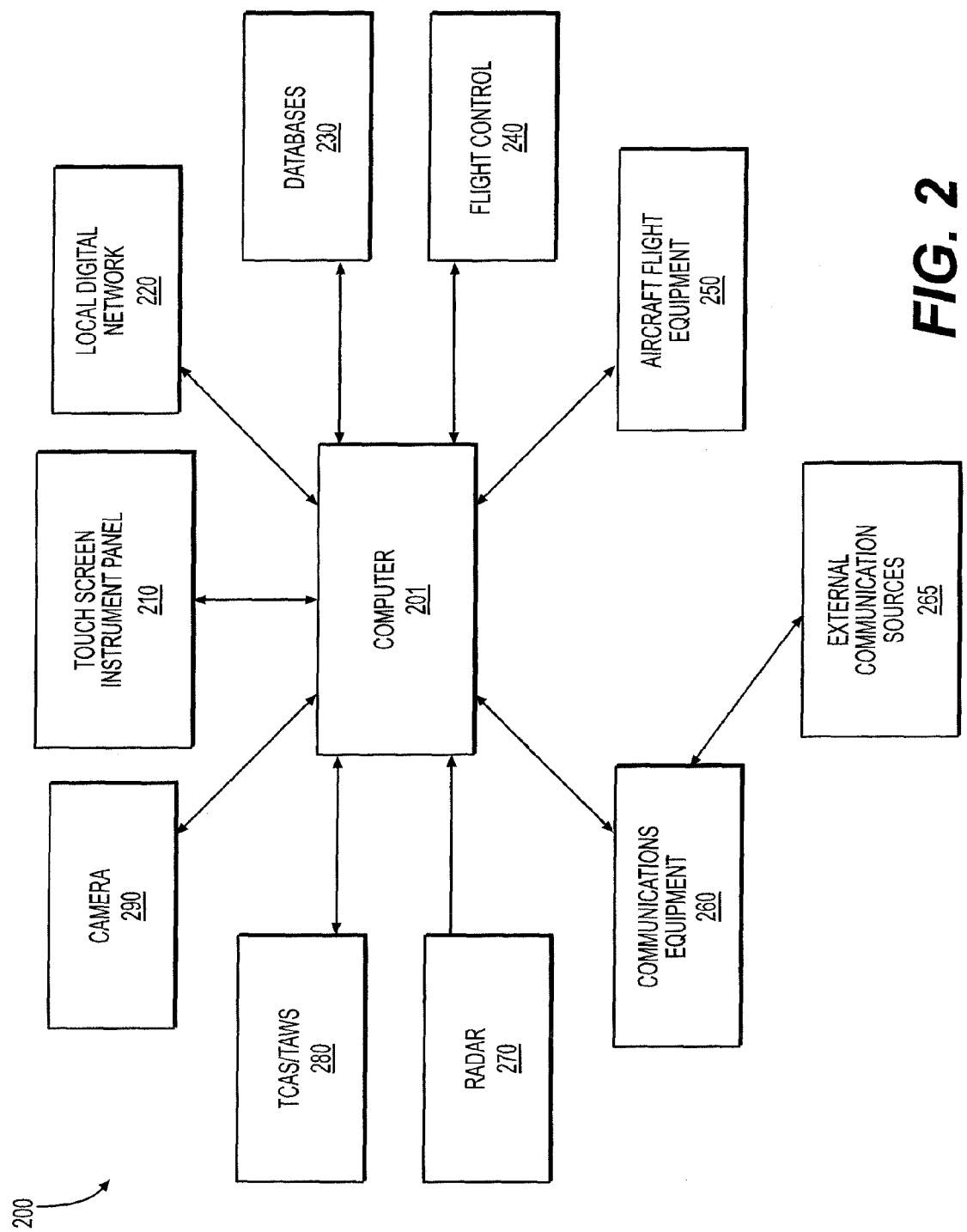
FIG. 2 depicts a system diagram for an embodiment of a touch-screen instrument panel system for an aircraft, in accordance with an embodiment of the present invention.

FIG. 2 provides an embodiment of a system environment 200 including an aircraft touch-screen instrument panel (TSIP) 210. System environment 200 has a network of subsystems that includes an on-board computer 201, the TSIP itself 210, a local digital network 220, databases 230, a flight controller 240, aircraft flight equipment 250, communications equipment 260, radar 270, an anti-collision and terrain awareness 280, and a camera 290. Communications equipment 260 communicates with external communication sources 265, which are not physically located onboard the aircraft (for example, terrestrial communications, satellites, and other aircraft). TSIP 210 interacts with the subsystems of system environment 200 through computer 201.

On-board computer 201 includes for example non-volatile memory, software, and a processor. TSIP 210 serves as a user interface for computer 201. Memory stores software that includes machine readable instructions, that when executed by processor provide control and functionality of system environment 200 as described herein. Computer 201 has for example electronic circuitry including relays and switches to electrically connect with components of system environment 200. In an embodiment, computer 201 includes a first computer and a second computer located on-board the aircraft, where the second computer mirrors the first computer, thereby providing redundancy in the event of a computer failure. It should be recognized that where a single computing device (e.g., computer 201) is represented graphically, the component might be represented by multiple computing units in a networked system or have some other equivalent arrangement which will be evident to one skilled in the art.

TSIP 210 provides a user interface for visualizing and controlling subsystems of system environment 200 through computer 201. TSIP 210 includes a substrate that supports a display and a touch membrane. Substrate is a transparent material such as glass, acrylic, polycarbonate or other approved for flight materials on which display and touch membrane are overlaid. In an embodiment, substrate is made of flexible material for conforming to aircraft cockpit dimensions, including complex shapes such as corners. In an embodiment, substrate has a large aspect ratio for providing images. Display is for example an organic light-emitting diode (OLED) display, which is thin and flexible for layering onto substrate. When unpowered, display is, in embodiments, transparent. Touch membrane is a thin, transparent and flexible material that is layered onto display and capable of sensing touch. Touch membrane is for example a resistive, capacitive, optical, or infrared touchscreen. Together, touch membrane and display provide TSIP 210 with a visual display that a user may control by touching with one or more fingers or a stylus.

Local digital network 220 provides a digital connection between computer 201 and on-board subsystems, such as cabin management subsystem (CMS) and in-flight entertainment (IFE). CMS includes for example cabin lighting, heating, air conditioning, water temperature, and movement of shades. IFE includes for example audio and video content. TSIP 210 provides an interface for monitoring and controlling CMS and IFE over local digital network 220.

Databases 230 are digital databases stored in memory of computer 201 on-board the aircraft. Databases 230 include charts, manuals, historical aircraft component data, and checklists. Databases 230 allow pilots to quickly access and search information via computer 201. TSIP 210 displays the information such that pilots maintain a heads-up view while piloting an aircraft. Historical aircraft component data is for example updated during flight with data from aircraft flight equipment 250 (e.g., sensors) via computer 201.

Flight controller 240 provides navigation, avionics, and autopilot functions. In an embodiment, flight controller 240 is a standalone unit supplied by an independent manufacturer (e.g., Garmin, Honeywell, Rockwell Collins). TSIP 210 displays aircraft information from flight controller 240 via computer 201 such as airspeed, altitude, heading, yaw, and attitude (i.e., pitch and bank).

Aircraft flight equipment 250 includes flight control surfaces, engines, deicing equipment, lights, and sensors (e.g., temperature, pressure, electrical). Aircraft flight equipment 250 is monitored and controlled by pilots using TSIP 210 through computer 201 for flying aircraft.

Communications equipment 260 allows pilots to communicate with one another, with passengers, and with airports and other aircraft. Communications equipment 260 includes radios, phones, and internal and external digital networks (e.g., Internet and Intranet). Different frequency bands are used for example to transmit and receive data with multiple recipients. TSIP 210 allows pilots to communicate with others by using communications equipment 260 via computer 201.

Communications equipment 260 includes a transceiver configured to communicate with external communication sources 265, which include for example terrestrial based communication towers, satellites, and other aircraft. External communication sources 265 also provide communications with for example radio, global positioning system (GPS), and Internet. TSIP 210 provides a user interface for communicating with external communication sources 265, enabling a pilot or co-pilot to communicate with air traffic control, terrestrial communication towers (e.g., navigation towers, waypoints), satellites, and directly with other aircraft for example. TSIP 210 allows pilots to receive and transmit external communications through communications equipment 260 and computer 201.

Satellites provide network links for phone and internet communications, and GPS information. Aircraft interact with satellites using communications equipment 260 to transmit and receive radio frequency signals. TSIP 210 allows pilots to communicate via satellites through computer 201 and communications equipment 260.

Other aircraft within view of camera 290 are displayed in real-time on a panoramic view provided by TSIP 210. Information about other aircraft, which may be retrieved from radar 270 or radio communication, is displayed for improved pilot awareness and ease of contact.

Radar 270 includes equipment for determining a location and speed of objects from radio waves. Equipment for radar 270 includes a radio transmitter for producing pulses of radio waves and an antenna for receiving a reflected portion of the radio waves from nearby objects. TSIP 210 receives information from radar 270 via computer 201 and uses the information to display the location of nearby objects, such as weather, terrain and other aircraft.

Anti-collision and terrain awareness 280 includes a traffic collision avoidance subsystem (TCAS) and a terrain awareness and warning subsystem (TAWS). Anti-collision and terrain awareness 280 includes radar 270 and transponder information to determine aircraft position relative to other aircraft and Earth terrain, and to provide appropriate warning signals. TSIP 210 displays these warnings and allows pilots to respond to them by, for example, silencing an audible warning signal.

Camera 290 provides forward looking images to TSIP 210 through computer 201. Camera 290 is mounted for example under the aircraft nose. In alternative embodiments, camera 290 is located on the tail or on aircraft wings. Camera 290, in embodiments, receives one or both of visible light as well as infrared (IR) light. Further, in embodiments, camera 290 provides high-definition (HD) quality images (e.g., using an HD capable camera). In a preferred embodiment, camera 290 provides HD quality and IR functionality. Alternatively, camera 290 might include two separate cameras, one for HD quality and a second camera for IR imaging.

Camera 290 provides images to computer 201, which renders the images for real-time projection on TSIP 210. TSIP 210 projects HD panoramic views looking forward and below from the front of the aircraft. The forward view spans an angle of about 120° to about 180° for example. In an embodiment, TSIP 210 uses IR imaging to project a synthetic view, which is for example useful at night or when flying through clouds or fog that obscure visible light.

Various components of the user interface displayed on TSIP 210 are designed to provide a synoptic view of the condition of the aircraft, meaning that the user interface components provide an intuitive, broad view of the aircraft, its various components and subsystems, and their condition. The user interface utilizes the touch screen functionality of the TSIP 210 to present views of the aircraft to intuitively communicate information and accept input from the pilot. The views of the aircraft incorporate graphical, textual, and numerical elements to simultaneously convey multiple pieces of information to the pilot. The graphical, textual, and numerical elements of the user interface may flash, change color, change content, appear, disappear, move or change location, or otherwise change in response to user input or the state of the aircraft systems.

The computer 201 monitors the aircraft's data busses to determine the positions, temperatures, pressures, and states of various equipment and systems of the aircraft. TSIP 210 graphically displays the data gleaned from the busses in the appropriate synoptic panels or windows for flight crew interaction. The inventive user interface provides a thorough, easily understood, intuitive and user-friendly interaction with each synoptic user interface. The touch screen functionality of TSIP 210 also allows the user to activate aircraft systems and change configuration settings through user interface displayed on TSIP 210.

The user interface may provide for a variety of user interface elements grouped into a variety of "windows", which may also be referred to as "panels" or "pages. Some user interface elements are common to a plurality of the synoptic user interface panels. For example, each user interface panel may comprise a border surrounding the information displayed in the user interface and defining a "panel". A title for each user interface may be displayed within the panel or on the border of the panel area. In some embodiments, the title is displayed in the top or the bottom left or right corner of the panel. The title may optionally be displayed as an abbreviation. Similar to other known graphical user interfaces, each "window" or "panel" may be provided with controls for closing or minimizing the panel to remove it from active display on the TSIP 210.

In some embodiments of the user interface, a silhouette, cross-section, or other diagram of an aircraft is utilized to illustrate the state of the aircraft and convey relevant information to the pilot. The diagram of an aircraft may be a top, bottom, side, front, back, or perspective view of an aircraft. The windows may incorporate both static elements and active controls. Static elements comprise elements that are fixed or are updated automatically by the system to display the current aircraft configuration. Active controls may be updated automatically by the system to display the current aircraft configuration, but are also capable of interacting with the user via TSIP 210 to receive pilot input.

As previously mentioned, the present invention is directed to providing a synthetic vision display in combination with the TSIP. SVS have been used in aircraft for quite some time to improve situational awareness. However, the synthetic vision enhancements were either applied entirely or not at all. SVS are not currently available in a gradient-type application. In other words, synthetic vision enhancements have not been applied to a real-time image to achieve an image that is a combination of a real-time image and a synthetic vision enhancement. For example, rather than turning the SVS on and viewing a 100% synthetic image, a user could, utilizing the present invention, indicate that a synthetic vision enhancement should be applied according to a synthetic vision application value. A synthetic vision application value, as used herein, refers generally to a numerical value with which to apply a synthetic vision enhancement. In embodiments, the synthetic vision application value is a percentage value. In additional embodiments, the synthetic vision application value is a percentage value less than 100% to achieve a combination of a synthetically enhanced image and the real-time original image.

Figure 3:
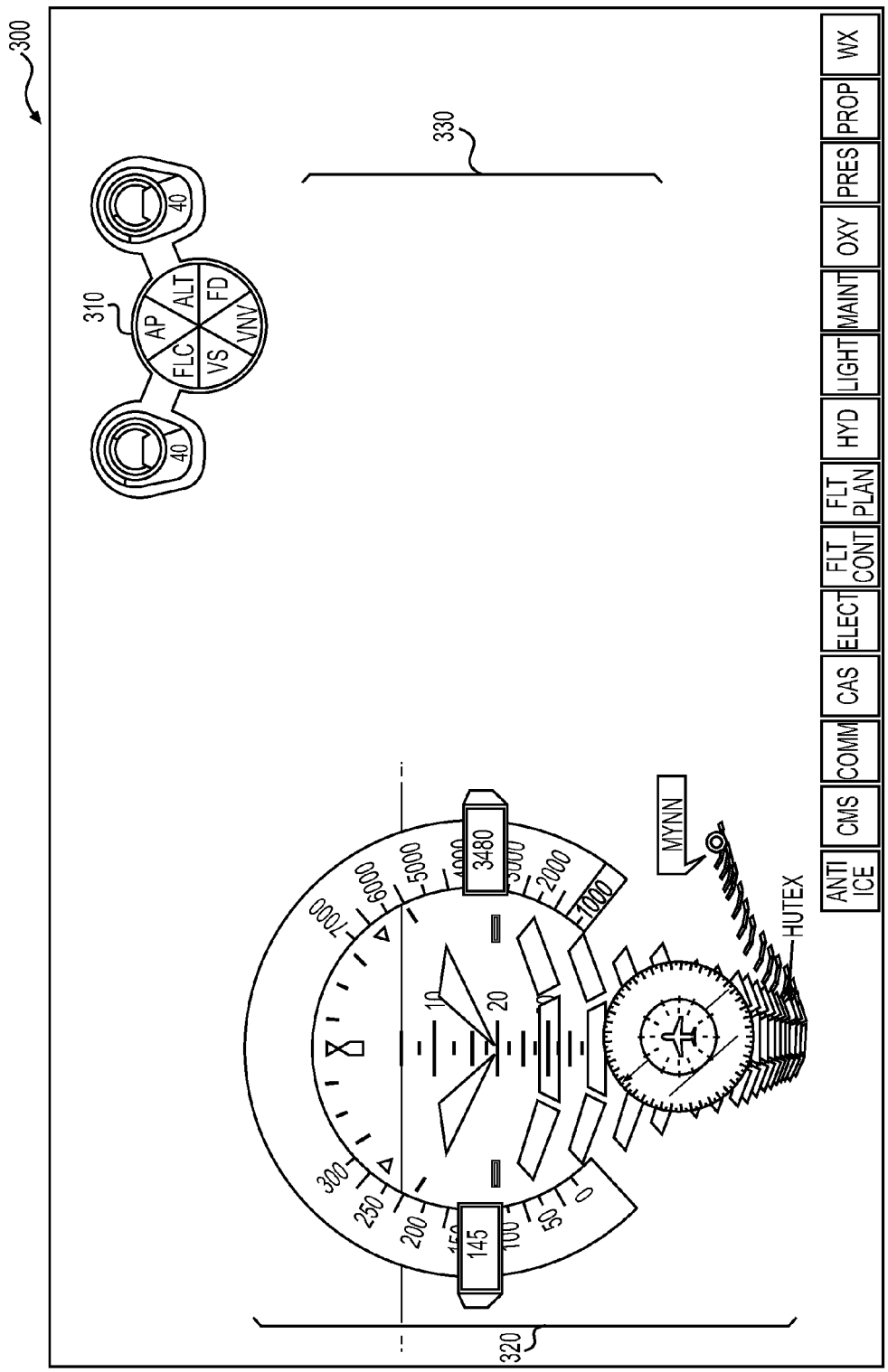
FIG. 3 depicts an exemplary graphical user interface in which a real-time view is displayed, in accordance with an embodiment of the present invention.

In application, a real-time image is captured by, for example, the camera 290 of FIG. 2, and displayed via the TSIP 210. The real-time, unenhanced, image may be referred to as an original image herein. FIG. 3 illustrates an exemplary graphical user interface (GUI) 300 in which a real-time image is displayed. The GUI includes, as previously identified, one or more flight instrument displays 310, one or more navigational displays 320 and the underlying real-time image 330. As is shown in FIG. 3, the real-time image 330 does not include much detail as visibility is low in this example. Thus, one could imagine the view of the real-time image 330 as it is displayed is merely fog, clouds, etc.

The original image may be modified to include synthetic vision enhancements upon receiving an indication to apply a synthetic vision application or enhancement to the original image. The indication may be a user selection from a menu of the TSIP or any other means available to activate or apply a synthetic vision enhancement.

Once indicated, a synthetic vision application value is identified and applied to an original image. The synthetic vision application value may be user input. Alternatively, a default value may be set in the system to be automatically applied such as, for example, 50%. Any desired value may be set as the default value.

Figure 4:
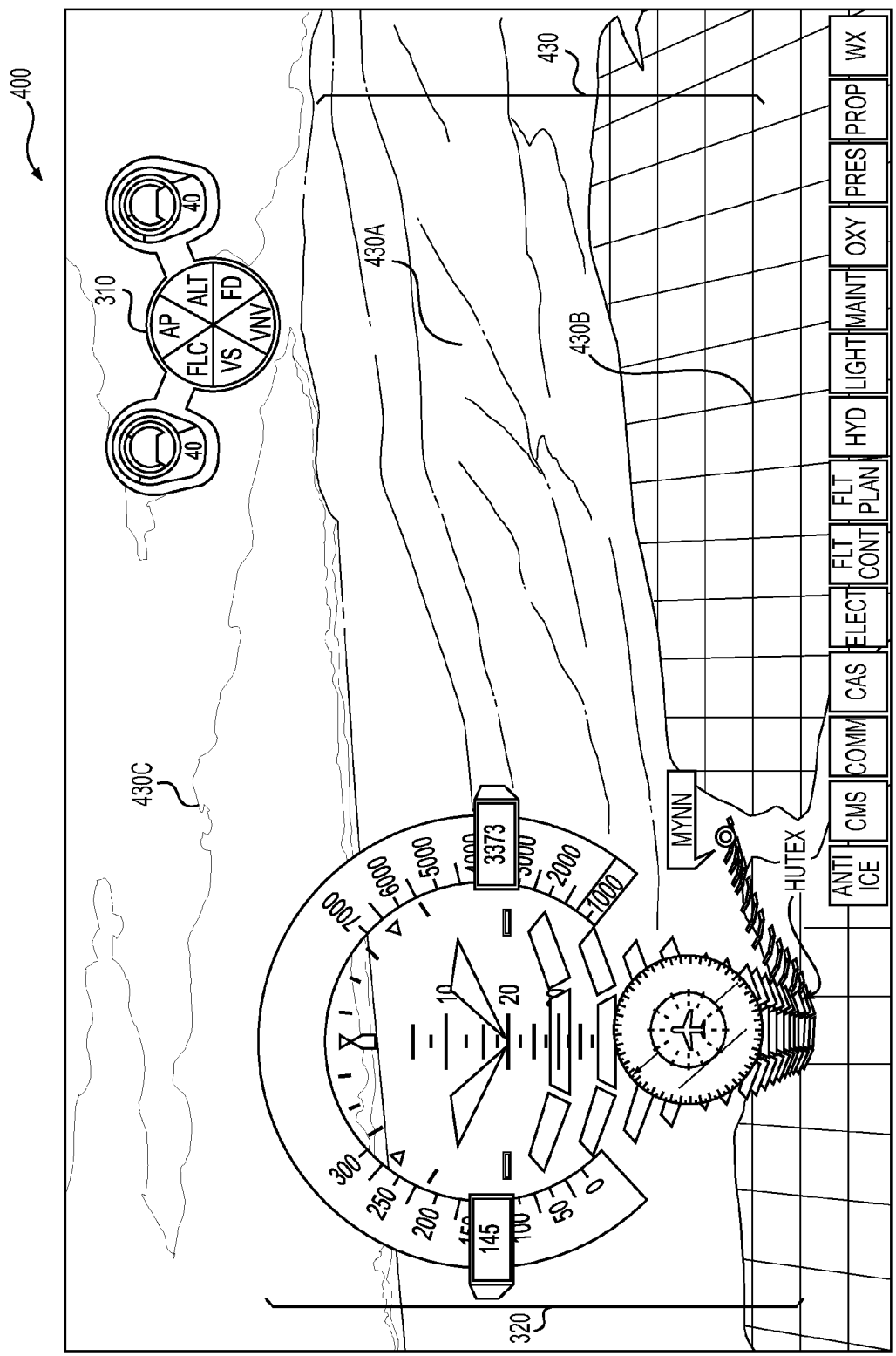
FIG. 4 depicts an exemplary graphical user interface in which a modified view including both the real-time view with an overlaying synthetic vision enhancement is displayed, in accordance with an embodiment of the present invention.

The indicated synthetic vision enhancement may be overlaid on the original image to generate a modified image. FIG. 4 illustrates an exemplary GUI 400 in which an original image is modified, or overlaid, with a synthetic vision enhancement according to a synthetic vision application value. FIG. 4 includes a modified image including a synthetic vision enhancement at a 50% application value. As is clear in FIG. 4, the GUI 400 includes a view area 430 that is much clearer and more detailed than that in FIG. 3. Note that the images in FIG. 3 and FIG. 4 are identical and are only different in the amount of synthetic vision applied to illustrate the clarity achieved with the gradient functionality of the synthetic vision application of the present invention. FIG. 4 clearly identifies various parts of a landscape including terrain 430*a*, water 430*b*, and clouds 430*c*. The markers identified in FIG. 4 (i.e., terrain, water, clouds) are merely exemplary in nature and any identifying markers could be included in a view.

Figure 5:
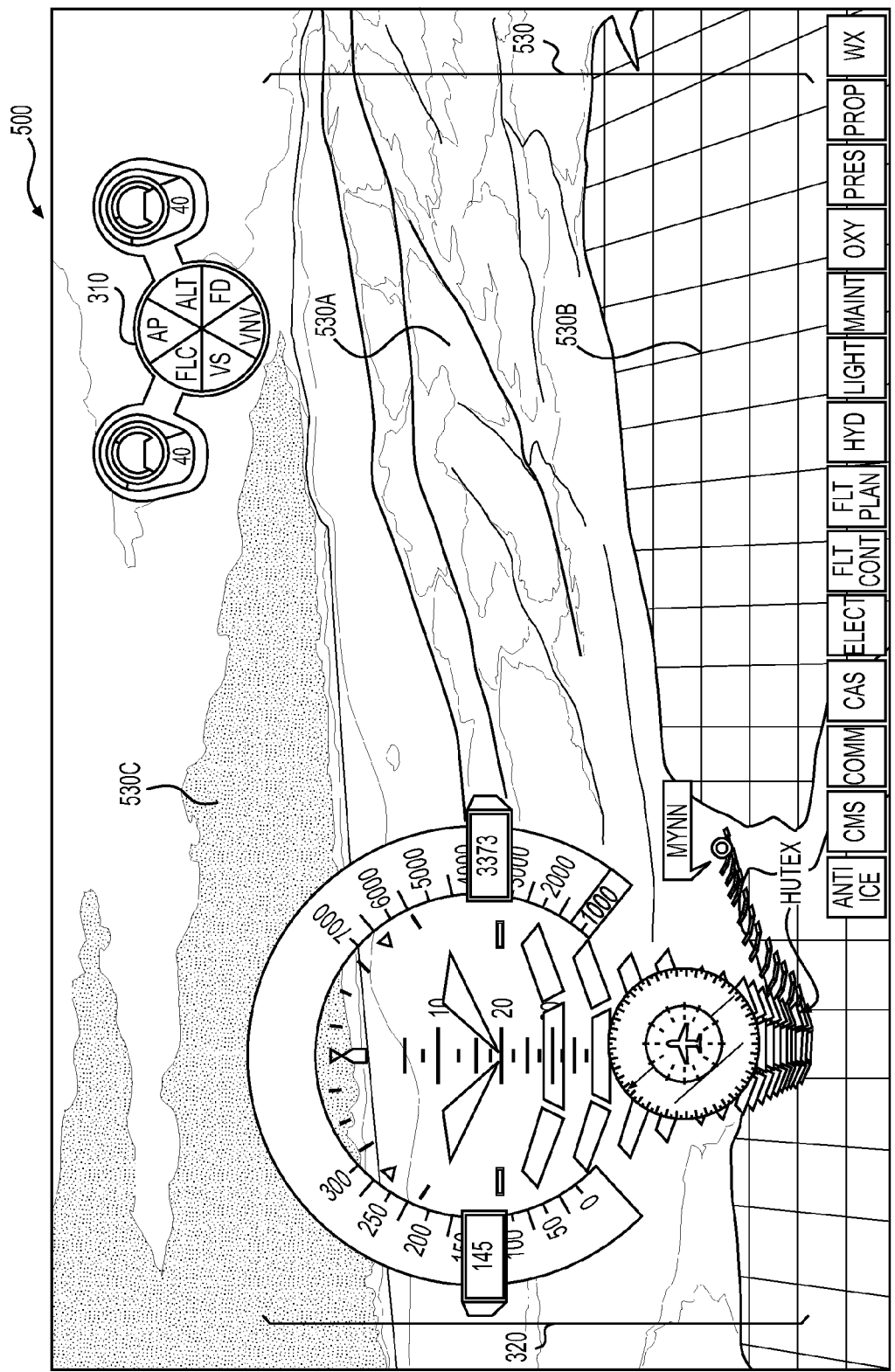
FIG. 5 depicts an exemplary graphical user interface in which a modified view including both the real-time view with an overlaying synthetic vision enhancement is displayed, in accordance with an embodiment of the present invention.

FIG. 5 goes on to include a detailed GUI 500 in which the original image is modified, or overlaid, with a synthetic vision enhancement according to a synthetic vision application value. FIG. 5 includes a modified image including a synthetic vision enhancement at a 90% application value. The application values illustrated in FIGS. 3, 4, and 5 are merely exemplary in nature and any value from 0-100% is possible. Ideally, a value less than 100% is utilized to achieve an image combining both a synthetic, digitally created view with a real-time, original view. Also, as with FIG. 4, the image of FIG. 5 is identical to that of FIG. 3, it is merely illustrating the original image of FIG. 3 overlaid with a synthetic enhancement. As is shown in FIG. 5, the view area 530 includes the landscape shown in FIG. 4, but with a higher degree of clarity. For instance, more details are visible in terrain 530*a* and clouds 530*c*. Also present is water 530*b*.

The gradient-type feature of the synthetic vision application provides users the ability to dynamically adjust images. This improves situational awareness by allowing users more power in controlling the image. For example, on a foggy/cloudy day, a user may need more synthetic vision to "see" through the weather but as the fog/clouds lift, the user could reduce the amount of synthetic vision enhancements to bring in real images to better identify landmarks (e.g., roads, rivers, houses, etc.) that the synthetic vision would not show.

Figure 6:
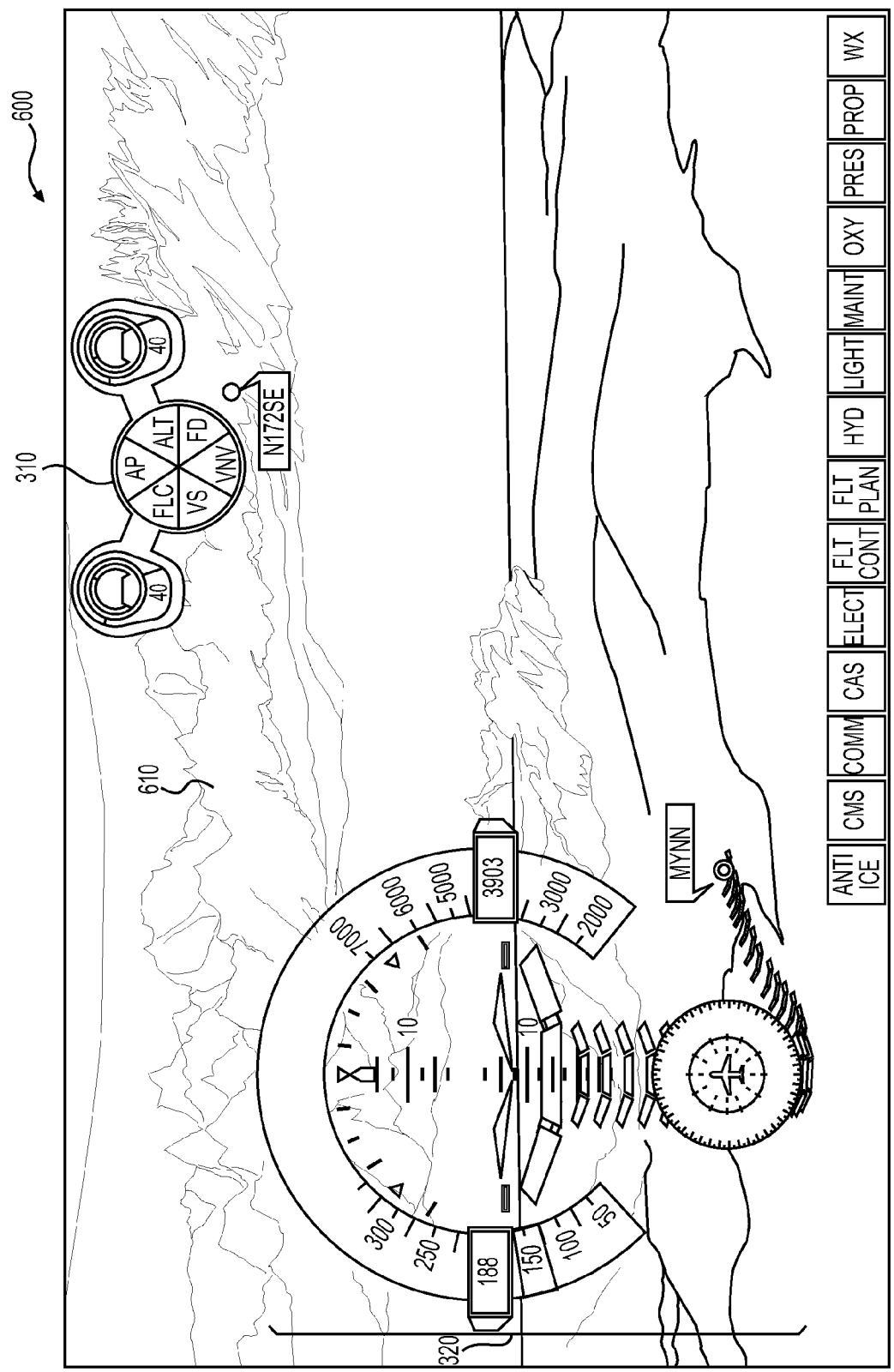
FIG. 6 depicts an exemplary graphical user interface in which a synthetic vision view and three-dimensional weather representations are displayed, in accordance with an embodiment of the present invention.

The TSIP 210 may be further configured to display data in a three-dimensional view. Weather, for instance, may be displayed in a three-dimensional view in combination with the original image. Alternatively, data (e.g., weather) may be displayed in a three-dimensional view in combination with a modified image including the original image and a synthetic vision enhancement. This embodiment is illustrated in FIG. 6 where a GUI 600 is provided that illustrates a modified view with a synthetic vision enhancement (note distinction in the view from FIG. 3) and also including a three-dimensional weather representation 610. Previously, this combination presentation was not achieved since SVS data was typically presented on such a small display and overlaying any information could render the synthetic vision image useless (e.g., too much information in the small screen could overload or confuse the user). In the present invention, the TSIP 110 provides such an expansive view that many data points can be overlaid, including weather and synthetic vision, without overloading or confusing an image or a user. Furthermore, the ability to control the synthetic vision application value allows users to scale back the synthetic vision application when appropriate so that other items such as weather, for instance, may be highlighted when necessary.

Figure 7:
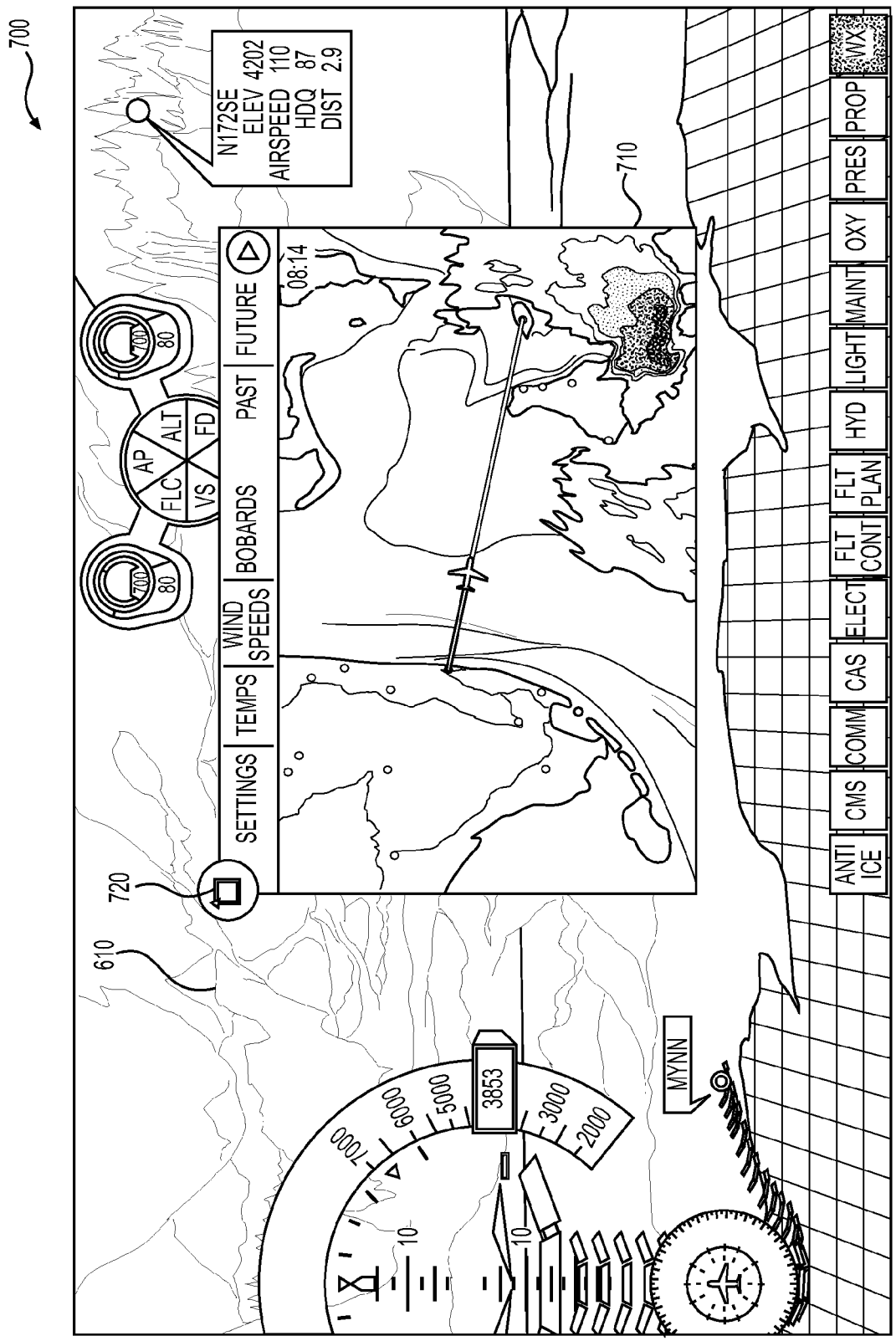
FIG. 7 depicts an exemplary graphical user interface in which a two-dimensional weather user interface panel overlays the three-dimensional weather representations, in accordance with an embodiment of the present invention.

Furthermore, two-dimensional user interface panels may be provided at any view of the TSIP. For instance, user interface panels may be provided over an original image, a modified image including an original image and a synthetic vision enhancement, or a modified image including an original image, a synthetic vision enhancement, and a three-dimensional representation. FIG. 7 provides a GUI 700 illustrating an embodiment where a two-dimensional user interface panel 710 is provided over a modified image (e.g., an original image overlaid with a synthetic vision enhancement) including a three-dimensional representation 610 (e.g., weather). In the illustration of FIG. 7, the three-dimensional representation 610 is weather. Additionally, the two-dimensional user interface panel 710 is a weather user interface panel but could be any other panel configured by the system. The two-dimensional user interface panel 710 may be moved to any portion of the TSIP 210 or may be closed by selection of indicator 720. Additionally, the user interface panel 710 may be pinned to the TSIP such that is may be manipulated with user gestures within the user interface panel 710. For instance, the user interface panel 710 itself may be pinned to the TSIP such that the user interface panel 710 is stationary. Then a user could manipulate the user interface panel 710 via one or more gestures such as, for example, scrolling within the user interface panel 710, zooming in or zooming out the user interface panel 710 view via gestures, and the like.

In application, a second modified image may be generated upon receiving an indication that weather information (whether two or three-dimensional) is to be included in an image. The second modified image may be a modified image that includes the original image and a synthetic vision enhancement combined with weather information. Alternatively, weather information may be overlaid with an original image. For instance, an original image could be modified to include three-dimensional weather representations without the addition of any synthetic vision enhancements.

While various data points (e.g., synthetic vision enhancements, weather, etc.) may overlay an original image (i.e., view) the data can, at any time, be removed from the view.

Figure 8:
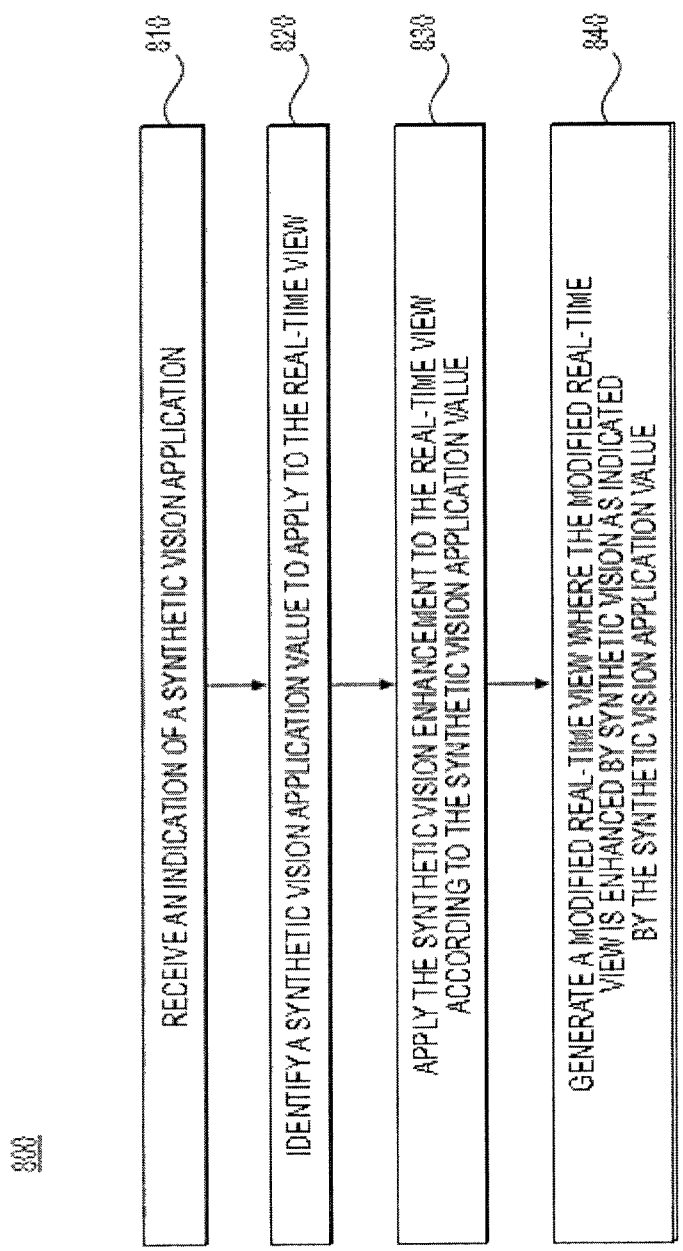
FIG. 8 is a flow diagram showing an exemplary method for displaying a real-time view within an aircraft, in accordance with an embodiment of the present invention.

With reference now to FIG. 8, a flow diagram is illustrated showing an exemplary method 800 for displaying a real-time view in an aircraft, in accordance with an embodiment of the present invention. As indicated at block 810, an indication of a synthetic vision application is received. The indication may enable the synthetic vision application for the real-time view. At block 820, a synthetic vision application value to apply to the real-time view is identified. A synthetic vision enhancement is applied to the real-time view according to the synthetic vision application value at block 830. A modified real-time view is generated where the modified real-time view is enhanced by synthetic vision as indicated by the synthetic vision application value at block 840.

Figure 9:
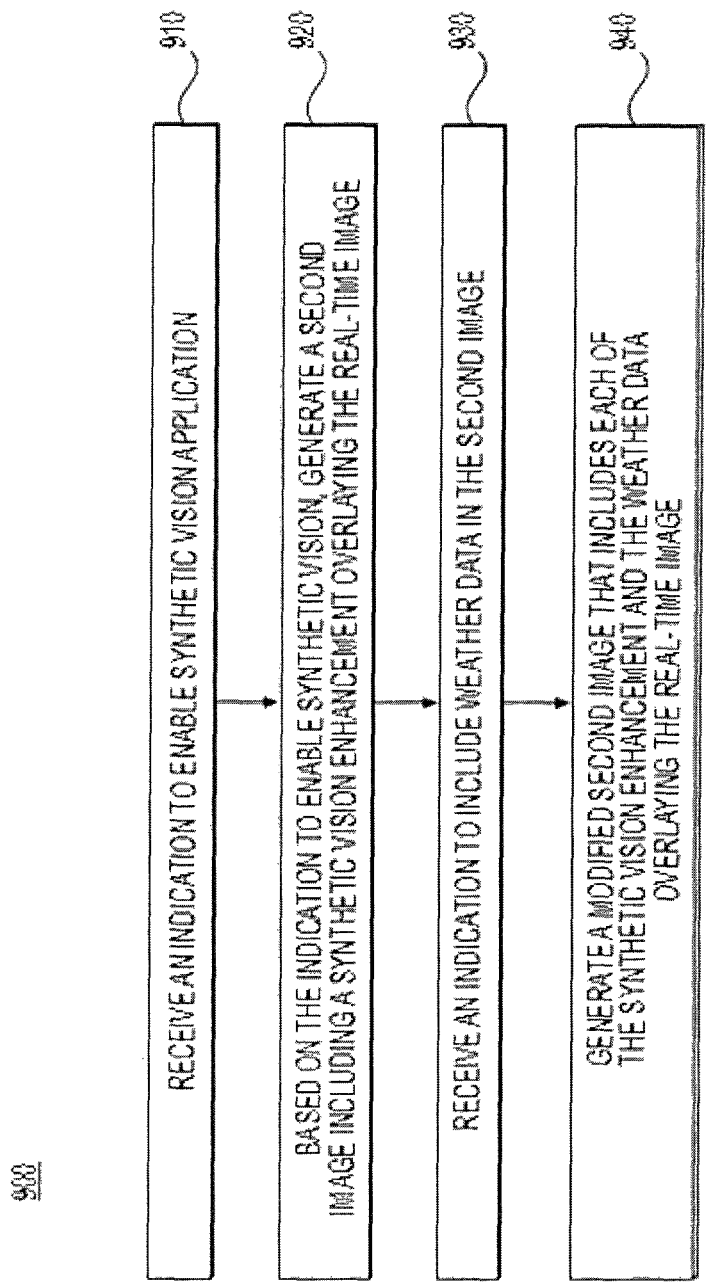
FIG. 9 is a flow diagram showing another exemplary method for displaying a real-time view within an aircraft, in accordance with an embodiment of the present invention.

With reference to FIG. 9, a flow diagram is provided showing yet another exemplary method 900 for displaying a real-time view within an aircraft. Initially, at block 910, an indication to enable synthetic vision is received. Based on the indication to enable synthetic vision, a second image including a synthetic vision enhancement is generated and the second image overlays the real-time image at block 920. At block 930, an indication to include weather data in the second image is received. A modified second image that includes each of the synthetic vision enhancement and the weather data is generated and the modified second image overlays the real-time image.

Embodiments of the invention have been described to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed but, rather, the invention is to cover all modifications, alternative constructions, and equivalents falling within the spirit and scope of the invention.

It will be understood by those of ordinary skill in the art that the order of the steps recited herein is not meant to limit the scope of the present invention in any way and, in fact, the steps may occur in a variety of different sequences within embodiments hereof. Any and all such variations, and any combination thereof, are contemplated to be within the scope of embodiments of the present invention.

The invention claimed is:

1. A method for displaying a real-time view within an aircraft, the method comprising:
   panoramically displaying the real-time view;
   receiving an indication of a synthetic vision application, wherein the indication enables the synthetic vision application for the real-time view;
   identifying a synthetic vision application value to apply to the real-time view;

applying a synthetic vision enhancement to the real-time view according to the synthetic vision application value; and generating a modified real-time view where the modified real-time view is enhanced by synthetic vision as indicated by the synthetic vision application value.

2. The method of claim 1, wherein the real-time view is captured by a high definition camera mounted to the aircraft.

3. The method of claim 1, wherein both the real-time view and the modified real-time view are configured for display via a touch screen display device, and the touch screen display device is used in executing both the receiving and generating steps.

4. The method of claim 1, wherein the synthetic vision enhancement overlays the real-time view to create the modified real-time view.

5. The method of claim 1, wherein one or more instructions for performing the method are embodied on one or more non-transitory computer-storage media.

6. The method of claim 1, wherein the synthetic vision application value is a percent value indicating an amount with which to modify the real-time view with the opaqueness of the synthetic vision enhancement.

7. The method of claim 6, wherein the percent value of synthetic vision is less than 100 percent such that the modified real-time view includes a combination of the real-time view and an enhancement of synthetic vision as indicated by the percent value.

8. A system for displaying a real-time view within an aircraft, the system comprising:
   a touch-screen display;
   a processor; and
   a memory having embodied thereon instructions that, when executed by the processor, cause a computing device to perform a method for displaying the real-time view on the touch-screen display within the aircraft, the method comprising:
   receiving on the touch-screen display an indication of a synthetic vision application, wherein the indication enables the synthetic vision application for the real-time view;
   identifying a synthetic vision application value to apply to the real-time view;
   applying the synthetic vision application value to the real-time view; and
   generating a modified real-time view on the touch screen display where the modified real-time view is the real-time view enhanced by synthetic vision as indicated by the synthetic vision application value.

9. The system of claim 8, wherein the real-time view is captured by a camera mounted to the aircraft.

10. The system of claim 8, wherein the synthetic vision enhancement overlays the real-time view to create the modified real-time view.

11. The system of claim 10, wherein the modified real-time view further comprises weather information.

12. The system of claim 8, wherein the synthetic vision application value is a percent value indicating a percentage of synthetic vision to apply to the real-time view.

13. The system of claim 8, wherein the modified real-time view includes a combination of the real-time view and an enhancement of synthetic vision according to the synthetic vision application value.

14. The system of claim 13, wherein the synthetic vision application value is less than 100 percent.

15. The system of claim 8 wherein both the real-time view and the modified real-time view are configured for display via a touch screen which spans a substantial portion of the cockpit.

16. The system of claim 8 wherein both the real-time view and the modified real-time view are configured for display via a touch screen which is accessible to both a pilot and a copilot.

17. One or more non-transitory computer-storage media having embodied thereon computer-usable instructions that, when executed, facilitate a method of displaying a real-time image on a touchscreen within an aircraft cockpit, the method comprising:
   receiving on the touchscreen an indication to enable synthetic vision;
   based on the indication to enable synthetic vision, generating a second image on the touchscreen including a synthetic vision enhancement overlaying the real-time image;
   receiving an indication on the touchscreen to include weather data in the second image; and
   generating a modified second image on the touchscreen that includes each of the synthetic vision enhancement and the weather data overlaying the real-time image.

18. The media of claim 17, wherein the weather data is a three-dimensional weather representation.

19. The media of claim 17, wherein the method further comprises: receiving an indication of a synthetic vision value using the touchscreen and implementing the value on the touchscreen.

20. The media of claim 19, wherein the synthetic vision enhancement is applied to the real-time image according to the synthetic vision value.

* * * * *